Patented June 14, 1932

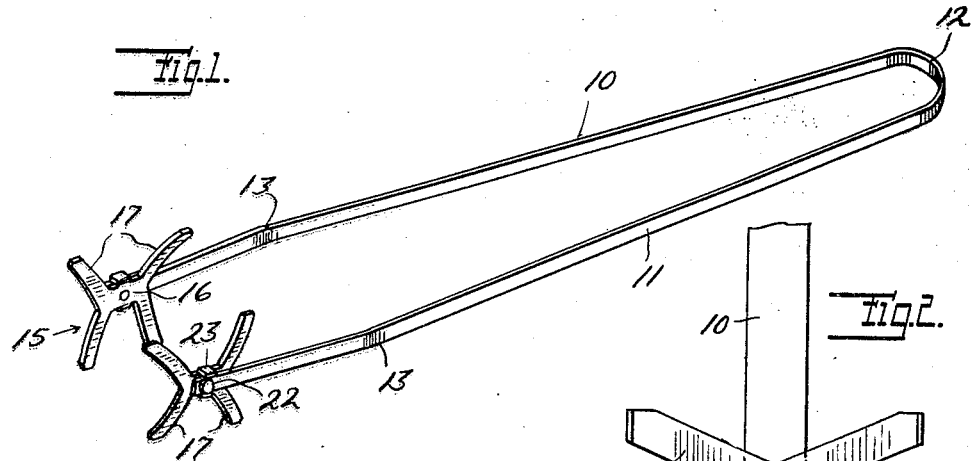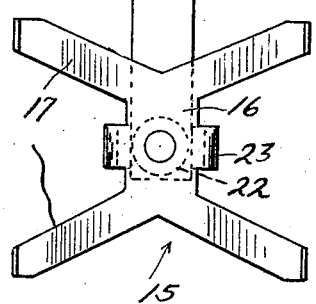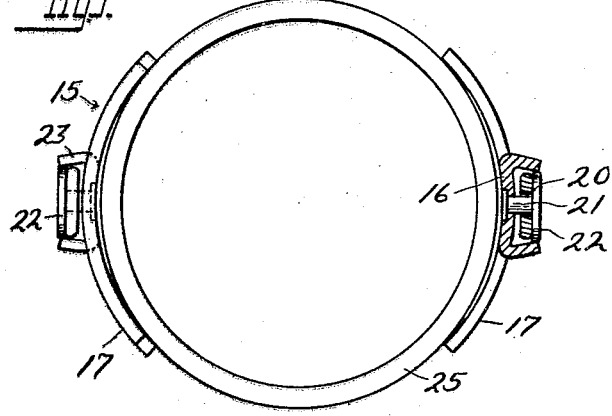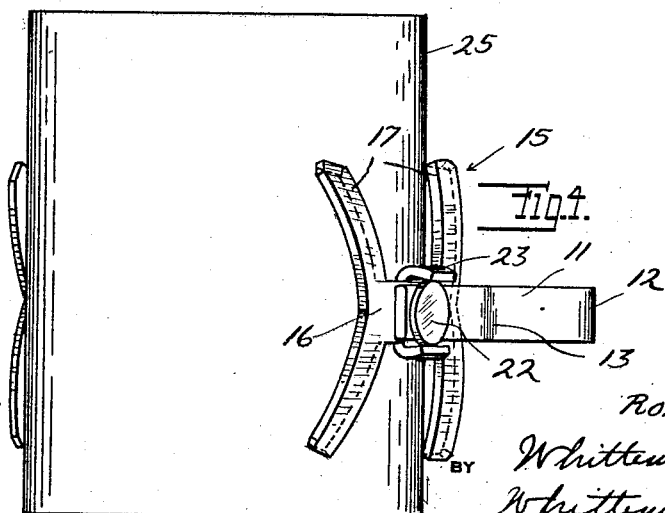

1,862,625

UNITED STATES PATENT OFFICE

ROBERT M. KERR, OF DETROIT, MICHIGAN, ASSIGNOR TO DETROIT DENTAL MANUFACTURING COMPANY, OF DETROIT, MICHIGAN, A CORPORATION OF MICHIGAN

TONGS

Application filed October 26, 1931. Serial No. 571,221.

This invention relates to tongs adapted more particularly for use in the handling of dental molding flasks and the like which are brought to a high heat in the molding or casting operation.

One of the primary objects of this invention is to provide tongs of the above mentioned character which will have gripping portions capable of adjusting themselves to the contour of the flask to be grasped.

A further object of this invention is to provide tongs of the above mentioned character which will have gripping portions mounted for substantially universal movement and to provide means for limiting the movement of these gripping portions so that the same will always be maintained in a position to facilitate the grasping of a flask or the like.

Numerous other objects and advantages of this invention will become more apparent as the following description proceeds, particularly when reference is had to the accompanying drawing, wherein:

Fig. 1 is a perspective view of a tongs construction constructed in accordance with the teachings of this invention;

Fig. 2 is an enlarged elevational view of one of the gripping members forming a part of the tongs;

Fig. 3 is an end elevational view of the tongs showing the same in engagement with a flask; and Fig. 4 is a perspective view of the tongs showing the same in a different position of gripping engagement with a flask.

Referring then particularly to the drawing wherein like reference characters designate corresponding parts throughout all views, the body or handle portion of the tongs comprises a strip of resilient metal fashioned to form the arms 10 and 11 integrally connected at one end by the U-shaped bend 12. The arms preferably normally diverge slightly from each other to adjacent their free ends where they are slightly bowed in the direction of each other, as designated by the reference character 13.

Mounted on the free ends of the arms of the tongs are gripping members designated generally by the reference character 15. Each gripping member comprises a spider-shaped member having a body portion 16 and arms 17 projecting therefrom. In the embodiment of the invention illustrated, it will be noted that four of these arms or fingers are provided and that the same diverge from each other and are bowed so that the opposed faces of the gripping members provide concave surfaces.

For mounting the gripping members on the arms of the tongs while providing for universal movement of the gripping members, an enlarged bore or opening 20 is formed in each of the arms of the tongs adjacent the outer free end thereof. Fixed in the body portion of each gripping member is a stud 21 which passes loosely through its respective opening 20 and is provided on its outer end with an enlarged head 22. It will be noted that the studs may not only rotate within their respective openings, but may also rock in all directions laterally relative thereto, thus providing for universal movement of the spiders relative to the arms of the tongs.

For limiting this universal movement of the spiders, the body portion of each spider is provided with the ears 23 which are bent outwardly on opposite sides of the body portion in a manner to loosely embrace the end of the arm on which the spider is mounted. It will be noted that these ears are spaced slightly from the adjacent edge portions of the arm and are adapted to engage the edge portions of the arm upon rotation of the spider to limit this rotative movement. Lateral rocking of each spider is limited by engagement of the body of the spider or the head of its stud with the adjacent portion of the arm on which the spider is mounted. It will thus be seen that while the spiders may move universally relative to their supporting arms, they are so limited in this movement that they will always be in a position to engage a flask which is to be grasped by the same.

As brought out before, the tongs are adapted more particularly for use in the handling of flasks or the like which are used in the casting of dental inlays. Such flasks are generally cylindrical in cross sectional shape and in use are filled with a suitable investment compound in which the mold is formed. The molding material is then placed in a suitable ladle formed in the investment compound, and the flask is then highly heated prior to the molding or casting operation. It is therefore necessary to provide tongs for the purpose of handling these flasks while they are thus highly heated.

In the drawing a dental flask of general construction is disclosed and designated by the reference character 25. It constitutes a feature of the subject construction that such a flask may be grasped by the tongs regardless of the direction of the presentation of the tongs to the flask. Thus, as illustrated in Fig. 3 of the drawing, if the tongs are presented to the flask in a direction axially of the flask, the opposed faces of the gripping members which present concave gripping surfaces are capable of firmly engaging the outer convex surface of the flask. If, on the other hand, the tongs are presented to the flask from the side of the same, the gripping members will still firmly engage the flask by virtue of the fact that the gripping fingers are bowed inwardly or toward the flask. Thus, while the body portions of the spiders may be spaced from the surface of the flask, the ends of the fingers will engage the flask, and each finger will exert equal pressure on the flask by virtue of the fact that the spiders are mounted for universal movement and may thus adjust themselves to the contour presented.

From the above it will be apparent that the invention provides a tongs construction which includes spider supporting arms normally held apart by the resiliency of the metal from which they are formed. The spiders are mounted for universal movement on the ends of the arms and may thus adjust themselves to the contour of the object to be grasped. Further, the spiders are limited in their universal movement with the result that they will always be so positioned relative to each other that a flask or the like may be grasped by the same. The construction is of simple design and may therefore be economically manufactured on a commercial scale.

While the invention has been described with some detail, it is to be understood that the description is for the purposes of illustration only and is not definitive of the limits of the inventive idea. The right is reserved to make such changes in the details of construction and arrangement of parts as will fall within the purview of the attached claims.

What I claim as my invention is:

1. In a tongs construction, the combination of spaced gripping arms, gripping members loosely mounted on said arms for universal movement with respect thereto, and means limiting movement of said gripping members relative to said gripping arms.

2. In a tongs construction, a pair of normally diverging spring arms integrally connected by a return bent portion, gripping members loosely mounted on said arms adjacent the free ends thereof for universal movement with respect thereto, and means for limiting movement of said gripping members relative to said arms.

3. In a tongs construction, a gripping arm, a gripping member, a stud fixed to said gripping member and loosely mounted in an opening in said gripping arm whereby said gripping member is mounted for universal movement with respect to said gripping arm, and means on said stud for limiting movement of said gripping member relative to the arm in one direction.

4. In a tongs construction, a gripping arm having an opening formed therethrough adjacent the gripping end thereof, a gripping member positioned on one side of said arm, and a shank fixed to said gripping member and projecting through the opening in said gripping arm and having a head positioned on the side of said gripping arm opposite to the said gripping member, said shank being of a cross sectional size substantially less than said opening whereby said gripping member is universally mounted with respect to said gripping arm.

5. In a tongs construction, a gripping arm having an enlarged opening formed therethrough adjacent the gripping end thereof, a gripping spider having a body portion and projecting finger portions, and a stud fixed to the body portion of said gripping spider and extending loosely through the opening in said gripping arm, said stud being provided with an enlarged head on its outer end, the enlarged head on said stud and the body portion of said gripping spider being arranged to engage the adjacent portions of the gripping arm to limit lateral rocking movement of the gripping spider relative to the gripping arm.

6. In a tongs construction, a gripping arm provided with an opening therethrough adjacent its gripping end, a gripping member, a stud fixed to said gripping member and extending loosely through the opening in said gripping arm, and members on said gripping member and engageable with the adjacent portion of the gripping arm for limiting rotative movement of the gripping member relative to the gripping arm.

7. In a tongs construction, a gripping arm having an opening therethrough adjacent the outer end thereof, a gripping spider having a body portion positioned adjacent the gripping end of the said arm, a stud fixed to the body portion of the said spider and projecting loosely through the opening in the said arm, and ears on the body portion of the spider bent to extend on opposite sides of the gripping arm to limit rotative movement of the gripping spider relative to the gripping arm.

8. In a tongs construction, an arm member, a gripping member, means mounting said gripping member on said arm member for universal movement with respect thereto, and means on one of said members engageable with the other of said members for limiting movement of said members relative to each other in one direction.

9. In a tongs construction, an arm member, a gripping member mounted on said arm member for universal movement with respect thereto, and means including ears formed on one of said members and engageable with the adjacent portion of the other of said members for limiting movement of said members relative to each other in one direction.

10. In a tongs construction, a gripping arm, a gripping member, means mounting said gripping member on said gripping arm for universal movement with respect thereto, and members on said gripping member and engageable with the adjacent portion of the gripping arm for limiting rotative movement of the gripping member relative to the gripping arm.

11. In a tongs construction, a gripping arm, a gripping member, means including a stud carried by said gripping member for connecting said gripping member to said gripping arm for universal movement with respect thereto, and means including a head on said stud for limiting rocking movement of said gripping member relative to said gripping arm.

12. In a tongs construction, a gripping arm, a gripping member, means including a stud for mounting said gripping member on said gripping arm for universal movement with respect thereto, a head on said stud for limiting rocking movement of said gripping member relative to said gripping arm, and ears on said gripping member for limiting rotative movement of said gripping member relative to said arm.

In testimony whereof I affix my signature.

ROBERT M. KERR.